E. A. SEARLES.
MILLING TOOL.
APPLICATION FILED SEPT. 8, 1910.

990,068. Patented Apr. 18, 1911.

Witnesses
C. H. Walker.
James B. Mansfield.

Inventor
Edwin A. Searles.
By Alexander Foxell
Attorneys

UNITED STATES PATENT OFFICE.

EDWIN A. SEARLES, OF DETROIT, MICHIGAN.

MILLING-TOOL.

990,068.  Specification of Letters Patent.  Patented Apr. 18, 1911.

Application filed September 8, 1910.  Serial No. 581,111.

*To all whom it may concern:*

Be it known that I, EDWIN A. SEARLES, of Detroit, in the county of Wayne and State of Michigan, have invented certain new and useful Improvements in Milling-Tools; and I hereby declare that the following is a full, clear, and exact description thereof, reference being had to the accompanying drawings, which form part of this specification.

This invention is an improvement in so called "milling tools" of that class in which removable teeth are employed, and the invention has particular reference to the construction of such teeth, and its object is to prevent the teeth shifting sidewise or tipping on the body of the cutter while in use, particularly when subjected to the severe strains of side or straddle milling.

Heretofore a great deal of trouble has been experienced in the practical use of milling tools, as ordinarily constructed, when cutting on the side or at an angle to the material being operated upon. The large inserted tooth milling cutters are principally used for such work, and under heavy duty the teeth, as heretofore constructed, even in the best makes of tools, are apt to tip and then such teeth as do not tip are apt to break off at the corners because of the extra duty brought upon them by the failure of the tipped teeth to perform their work properly.

Teeth constructed in accordance with my invention can be as readily inserted in the milling tool bodies as the ordinary teeth, but when inserted it will be impossible for them to tip or shift sidewise; and such teeth do not require any special construction of slot in or unusual treatment of, the cutter body; but when applied to such body they are practically as rigid as solid millers, or cutters.

I will now describe the invention with reference to the accompanying drawings which illustrate one well known form of milling tool body equipped with my novel teeth.

Figure 1:
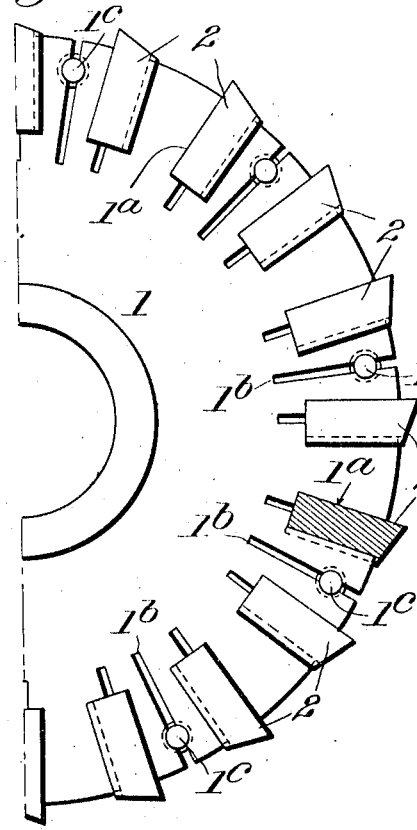
Figure 2:
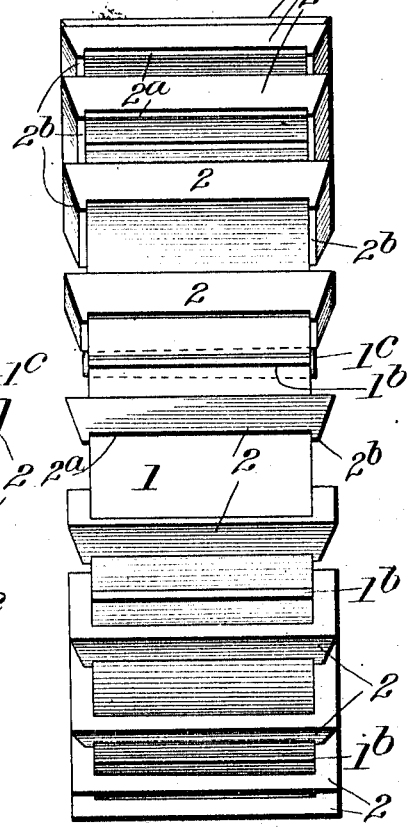
Figure 3:
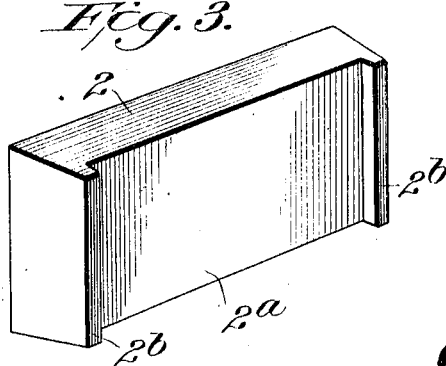
Figure 4:
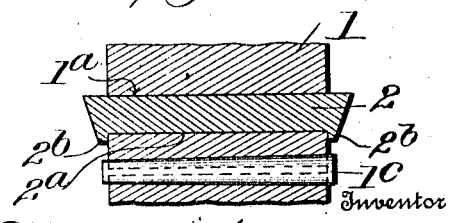

In said drawings—Figure 1 is an enlarged detail view of part of a well known form of milling tool, with my novel teeth applied thereto. Fig. 2 is an edge view thereof. Fig. 3 is an enlarged rear view of one of the teeth detached. Fig. 4 is a detail transverse section showing one of the teeth and the means for fastening same to the body.

The body of the cutting tool is ordinarily a circular disk of any desired diameter, and of a thickness somewhat less than the width of the cut to be made by the teeth. This body 1 is provided with radial slots $1^a$ to receive the removable teeth or cutters, and intermediate slots $1^a$ are narrow slits $1^b$ transfixed by taper-pin-holes $1^c$ in which, after the removable teeth are inserted in the slots $1^a$, pins $1^b$ are driven to spread the slits $1^c$ and contract slots $1^a$, and thus cause them to bind the teeth securely.

Thus far the construction is well known. The removable cutters or teeth as heretofore constructed have been of a thickness corresponding to the thickness of the slots $1^a$, and of a width equal to or slightly greater than the width of the disk 1, according to the cut that is to be made by the tool. When the tool is used for side cutting the teeth are subjected to unequal pressure, under which they are apt to tilt or be displaced sidewise in the slots, and the result is that the tool does not do its work properly, and the teeth are apt to be broken because of improper and undue strain to which they are subjected, particularly if making heavy cuts. In my invention I overcome these difficulties and objections by making the teeth 2 thicker than the slots $1^a$, and provide each tooth with a longitudinal groove $2^a$ in its back, which groove corresponds in width to the thickness of the body 1 of the cutter, and the thickness between the front side of the tooth and the bottom of the slot $2^a$ equals the thickness of the slot $1^a$, so that such a tooth can be readily inserted in a slot $1^a$, by having the slot $2^a$ engage the rear wall of the slot $1^a$, as indicated in the drawings; but the ribs $2^b$ which are formed by the slot on the rear side of the tooth, at opposite sides of the slot $2^a$, embrace the sides of the body 1 at the sides of the slot, as shown, and will make a close fit thereagainst. Consequently when such a tooth 2 is inserted in a slot $1^a$ it is bound between the front and rear walls of the slot against forward or backward movement, and it is bound by flanges $2^b$ against lateral movement in the slot, said flanges engaging the opposite sides of the body 1 at the ends of the slot, see Fig. 4. Such teeth also will be accurately positioned laterally by the flanges when applied to the cutter body; and will not be liable to any lateral displacement when the tightening bolts are driven in, so that lateral movement or tilting of the tooth in the slot is effectively prevented. A milling tool provided with such teeth can be worked and operated successfully under any conditions, either on side or face, and can perform the heaviest duty without the teeth being displaced.

It will be seen the improved teeth can be as readily applied to the disk as the ordinary teeth, and no special construction or shaping of the slots is required; and the groove 2ª in the tooth may be formed in rolling the steel from which the teeth are made so that the teeth will be practically no more expensive to manufacture than the ordinary teeth.

What I claim is:

In a milling tool, the combination of a body having peripheral slots; with removable cutter teeth adapted to be inserted in said slots; each tooth having a channel in its back to enable it to enter a slot, said channel forming flanges at each side of the tooth on the rear face thereof, said flanges being adapted to engage the opposite sides of the body at the outer ends of the slot and prevent lateral movement and displacement of the tooth when in the slot.

In testimony that I claim the foregoing as my own, I affix my signature in presence of two witnesses.

EDWIN A. SEARLES.

Witnesses:
WILLIAM J. CLARE,
CHAS. RHODES.